United States Patent
Lackey

(10) Patent No.: US 9,845,903 B2
(45) Date of Patent: Dec. 19, 2017

(54) HOSE JOINT WITH ADHESIVE

(71) Applicant: Cooper-Standard Automotive Inc., Novi, MI (US)

(72) Inventor: Stephen Lackey, Waterford, MI (US)

(73) Assignee: COOPER-STANDARD AUTOMOTIVE INC., Novi, MI (US)

( * ) Notice: Subject to any disclaimer, the term of this patent is extended or adjusted under 35 U.S.C. 154(b) by 178 days.

(21) Appl. No.: 14/559,973

(22) Filed: Dec. 4, 2014

(65) Prior Publication Data

US 2015/0084332 A1    Mar. 26, 2015

Related U.S. Application Data

(62) Division of application No. 12/161,871, filed as application No. PCT/US2007/063867 on Mar. 13, 2007, now abandoned.

(Continued)

(51) Int. Cl.
  *B29C 65/00* (2006.01)
  *B32B 37/00* (2006.01)
  (Continued)

(52) U.S. Cl.
  CPC ............ *F16L 13/103* (2013.01); *C09J 5/00* (2013.01); *F16L 33/34* (2013.01); *F16L 47/02* (2013.01); *B29C 65/48* (2013.01); *B29C 65/484* (2013.01); *B29C 65/485* (2013.01); *B29C 65/4875* (2013.01); *B29C 66/1122* (2013.01); *B29C 66/5221* (2013.01); *B29C 66/742* (2013.01); *B29K 2021/00* (2013.01); *B29K 2305/00* (2013.01); *B29L 2009/00* (2013.01);

(Continued)

(58) Field of Classification Search
  CPC ... B29C 65/48; B29C 65/485; B29C 66/5221; B29C 66/1122; B29C 66/5344; F16L 33/00; F16L 33/01; F16L 33/18; F16L 33/30; F16L 33/34; F16L 13/103; F16L 47/02
  USPC ... 156/60, 66, 153, 155, 250, 293, 294, 296, 156/303.1, 330; 285/915, 222.1; 138/DIG. 1, 103, 109, 118, 137
  See application file for complete search history.

(56) References Cited

U.S. PATENT DOCUMENTS 299,720 A     6/1884  Barr
1,558,503 A  10/1925  Pressler
(Continued)

FOREIGN PATENT DOCUMENTS

GB     1152649        5/1969
WO     2005/017006 A1  2/2005

OTHER PUBLICATIONS

International Search Report & Written Opinion for International Application No. PCT/US2007/063867 dated Dec. 23, 2008.
(Continued)

*Primary Examiner* — Philip Tucker
*Assistant Examiner* — Brian R Slawski
(74) *Attorney, Agent, or Firm* — Stephen T. Olson; Harness, Dickey & Pierce, P.L.C.

(57) ABSTRACT

A hose joint assembly includes a fitting, a hose receivable onto the fitting, and an adhesive for bonding the hose and the fitting together. For example, the adhesive is a microencapsulated two-part epoxy adhesive that functions as a lubricant when assembling the hose onto the fitting before curing.

12 Claims, 2 Drawing Sheets

Related U.S. Application Data

(60) Provisional application No. 60/781,782, filed on Mar. 13, 2006.

(51) Int. Cl.

| | | |
|---|---|---|
| *B32B 38/10* | (2006.01) | |
| *C09J 7/02* | (2006.01) | |
| *F16L 31/00* | (2006.01) | |
| *F16L 33/00* | (2006.01) | |
| *F16L 9/00* | (2006.01) | |
| *F16L 13/10* | (2006.01) | |
| *C09J 5/00* | (2006.01) | |
| *F16L 33/34* | (2006.01) | |
| *F16L 47/02* | (2006.01) | |
| *B29K 21/00* | (2006.01) | |
| *B29K 305/00* | (2006.01) | |
| *B29L 9/00* | (2006.01) | |
| *B29L 23/00* | (2006.01) | |
| *B29C 65/48* | (2006.01) | |

(52) U.S. Cl.
CPC ... *B29L 2023/005* (2013.01); *C09J 2205/306* (2013.01); *C09J 2400/163* (2013.01); *C09J 2400/226* (2013.01); *C09J 2421/006* (2013.01)

(56) References Cited

U.S. PATENT DOCUMENTS

| | | | |
|---|---|---|---|
| 3,353,850 A | 11/1967 | Butz et al. | |
| 3,805,567 A | 4/1974 | Agius-Sinerco | |
| 3,988,227 A | 10/1976 | Eldred | |
| 4,100,954 A | 7/1978 | Müller et al. | |
| 4,139,221 A | 2/1979 | Shotbolt | |
| 4,156,540 A | 5/1979 | Currie | |
| 4,359,502 A | 11/1982 | Caponigro et al. | |
| 4,586,734 A | 5/1986 | Grenier | |
| 4,733,438 A * | 3/1988 | Stupakis | F16L 33/22 24/19 |
| 4,808,639 A | 2/1989 | Chernack | |
| 4,964,657 A | 10/1990 | Gonzales | |
| 5,336,351 A * | 8/1994 | Meyers | B29C 37/0082 156/158 |
| 5,358,012 A | 10/1994 | Kish | |
| 5,549,949 A | 8/1996 | Williams et al. | |
| 5,821,293 A | 10/1998 | Roesch et al. | |
| 6,004,417 A * | 12/1999 | Roesch | C09J 9/00 156/155 |
| 6,308,992 B1 * | 10/2001 | Mitsui | F16L 33/30 285/133.11 |
| 6,755,217 B1 * | 6/2004 | Yoshida | F16L 11/112 138/121 |
| 7,080,860 B2 | 7/2006 | Takagi et al. | |
| 2002/0144808 A1 * | 10/2002 | Jones | F28D 1/05366 165/173 |

OTHER PUBLICATIONS

Stock, Dr. Jochen, "Chemie des Klebens—Chemistry of Adhesives" Innovative Technologies, Nov. 27, 2013.
Konieczko, Michael Boguelaw, "Fundamental Study of Adhesion Problems involving Polyethylene and other Polymers" Sep. 1979.
"What is the definition of wetting?", Tooling U-SME, http://www.toolingu.com/definition-670120-41247-wetting.html.

* cited by examiner

HOSE JOINT WITH ADHESIVE

REFERENCE TO RELATED APPLICATIONS

This application is a divisional of U.S. application Ser. No. 12/161,871 filed on Nov. 4, 2008, which is a National Phase application of PCT Application No. PCT/US2007/063867 filed on Mar. 13, 2007, which claims priority to U.S. Provisional Application No. 60/781,782 filed on Mar. 13, 2006.

BACKGROUND OF THE INVENTION

This invention generally relates to coupled hose assemblies. More particularly, this invention relates to clampless hose assemblies.

Hoses are widely known and used in a variety of different applications. For example, hoses are often used in vehicles to transport vehicle fluids between components. Typically, the hoses are connected to metal fittings to form a sealed joint between the hose and a component.

One difficulty associated with such joints is maintaining a seal between the hose and the metal fitting over the expected operating temperatures, fluid temperatures, fluid pressures, and bending of the hose. In a typical arrangement, the hose is fitted over the fitting and a clamped to seal the hose against the fitting. Often, a lubricant is used to facilitate sliding the hose onto the fitting. Although effective for sealing, variation in hose wall thickness, placement of the clamp, the strength of the clamp, and the lubricant add to the expense and complexity of the joint assembly.

Another typical arrangement uses a ferrule instead of a clamp. The ferrule is located over the fitting, forming an annular slot between the fitting and the ferrule. The hose is fitted over the fitting and into the annular slot. Typically, a lubricant facilitates sliding the hose over the fitting. The ferrule is then crimped to seal the hose against the fitting. Similar to the clamp, variation in hose wall thickness, placement of the ferrule, strength of the ferrule, and the lubricant add to the expense and complexity of the joint assembly.

Accordingly, there is a need for a simplified joint for sealing a hose and a fitting that does not use clamps or ferrules. This invention addresses those needs and provides enhanced capabilities while avoiding the shortcomings and drawbacks of the prior art.

SUMMARY OF THE INVENTION

An example hose joint assembly includes a fitting, a hose receivable onto the fitting, and an adhesive for bonding the hose and the fitting together. For example, the adhesive is a microencapsulated two-part epoxy adhesive that functions as a lubricant when assembling the hose onto the fitting before curing.

An example method of repairing a hose joint assembly includes the steps of removing a hose that is secured on a fitting, applying a lubricant/adhesive to the outer surface of the fitting or to an inner surface of a replacement hose, and sliding the replacement hose onto the fitting and curing the lubricant/adhesive. Removing the hose may include cutting the hose, which may form a score mark on the outer surface of the fitting. The lubricant/adhesive is of suitable viscosity to at least partially fill the score mark to thereby provide a leak-free hose joint assembly.

DETAILED DESCRIPTION OF THE PREFERRED EMBODIMENT

Figure 1:
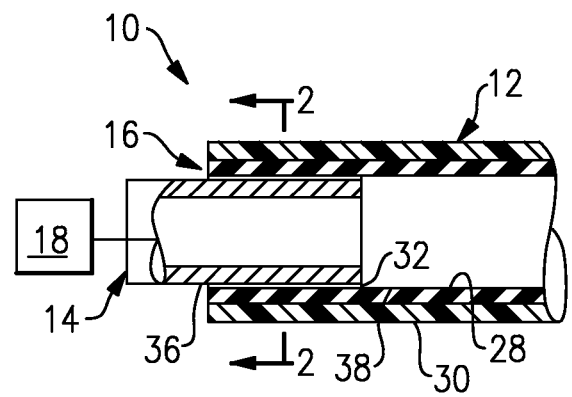
FIG. 1 illustrates selected portions of an example fluid handling system.

FIG. 1 illustrates selected portions of a fluid handling system 10, such as for a vehicle, home, or other application requiring fluid transfer. In this example, the fluid handling system 10 includes a hose 12 and a fitting 14 that is attached to the hose 12 at a joint 16. The fitting 14 may be formed of metal, and is in fluid communication with a component 18 of the fluid handling system 10. The component 18 may be any of a variety of known components, such as a vehicle transmission, a radiator, or other known component. The fitting 14 may be integral with the component 18, or alternatively be connected with a conduit or another hose to the component 18.

In the illustrated example, the hose 12 includes an inner layer 28 and an outer layer 30. In one example, the inner layer 28 is made of a rubber material, such as ethylene propylene diene monomer rubber. The outer layer 30 may be made of a rubber material, or other type of material such as a plastic material. In the illustrated example, the hose 12 wall thickness and the materials of the layers 28, 30 are selected to provide hose 12 flexibility.

In the illustrated example, the hose 12 fits over an outer surface 36 of the fitting 14. An adhesive 32 between the inner layer 28 and the outer surface 36 of the fitting 14 bonds the hose 12 and the fitting 14 together, and seals the joint 16 to prevent fluid from escaping through the joint 16.

The adhesive 32 serves several functions within the joint 16. For example, during assembly of the joint 16, uncured adhesive 32 is applied to an inner surface 38 of the inner layer 28. The hose 12 is then slid over the fitting 14. Before curing, the adhesive 32 is fluid and functions as a lubricant to facilitate the sliding movement between the hose 12 and the fitting 14. This provides the benefit of reducing the force required to slide the hose 12 over the fitting 14.

Figure 2:
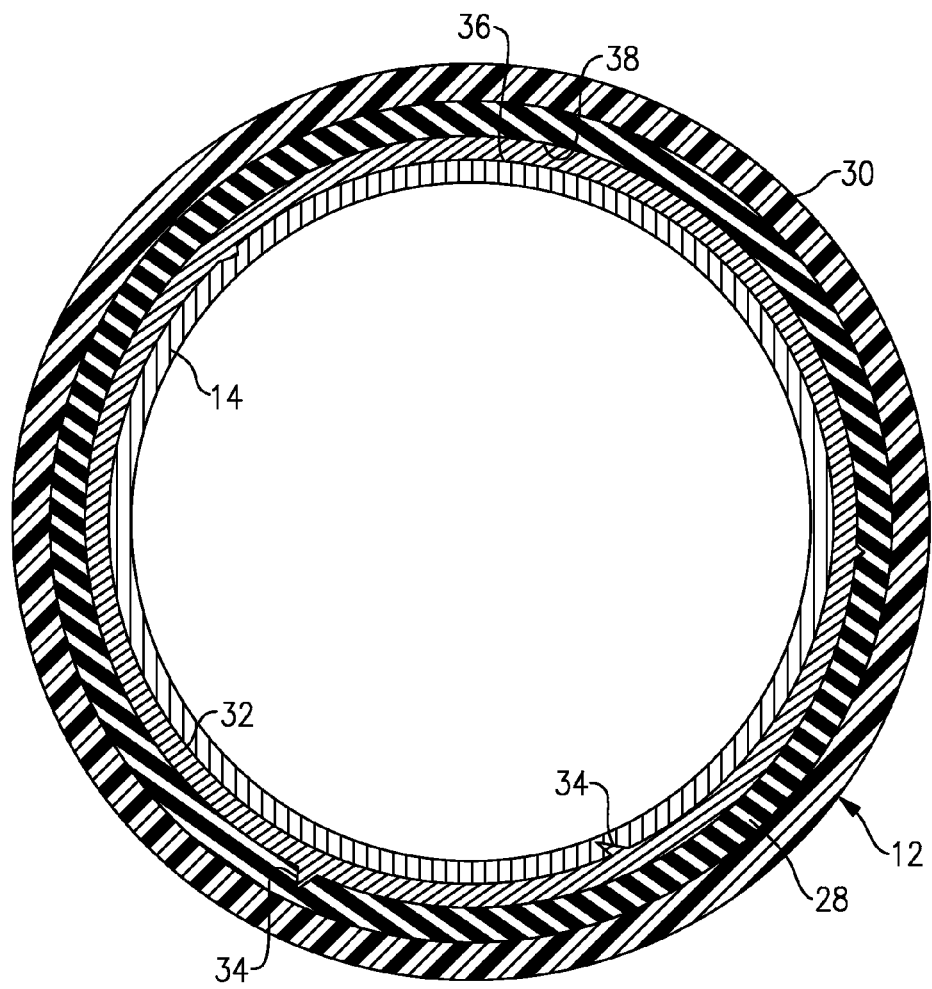
FIG. 2 illustrates a cross-sectional view along the section line 2-2 through the joint shown in FIG. 1.

As can be appreciated from FIG. 2, the hose 12 and the fitting 14 in this example include several imperfections 34. In one example, the imperfections 34 are surface scratches, micro-cracks, scoring marks or the like. The imperfections 34 have the potential to form a leak passage (i.e. a void), through the joint 16. In the illustrated example, the uncured adhesive 32 has a viscosity suitable to allow the adhesive 32 to flow into the imperfections 34. The degree to which the adhesive 32 fills the imperfections 34 depends on the size of the imperfections and the viscosity of the adhesive 32. With time, the adhesive 32 cures into a solid material and bonds the hose 12 with the fitting 14. The cured adhesive 32 within the imperfections 34 prevents fluid from escaping through the joint 16 via the imperfections 34. Thus, the joint 16 provides a leak-free connection between the hose 12 and the fitting 14. As can be appreciated, use of the adhesive 32 provides the benefit of joining the hose 12 and the fitting 14 without the need to use a clamp or ferrule, which is a drawback in the prior art.

In some examples, the fluid handling system 10 may require a repair that necessitates removal and replacement of the hose 12. In this regard, the hose 12 can be cut along its length and peeled back in an axial motion. This breaks the seal between the hose 12 and the fitting 14. The cutting of the hose 12 may leave an imperfection 34, such as a score mark, on the fitting 14. When a new hose 12 is assembled onto the fitting 14, the uncured adhesive 32 flows into the score mark, as explained above for the imperfections 34, to prevent the score mark from contributing as a leak path in the joint 16.

Figure 3:
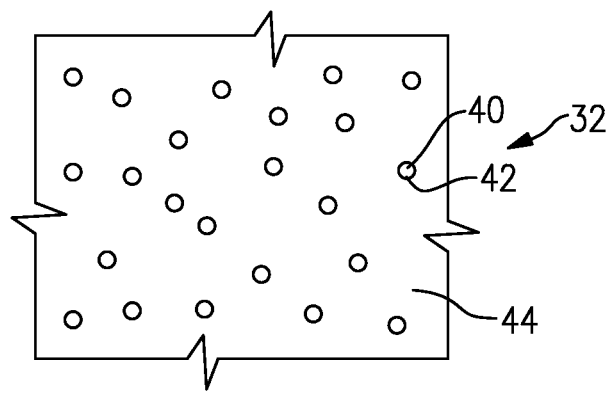
FIG. 3 illustrates an example microencapsulated adhesive used in the joint shown in FIG. 1.

FIG. 3 illustrates an example portion of the adhesive 32, which is a microencapsulated adhesive. The microencapsulated adhesive is a two-part epoxy, wherein one of the parts 40 (e.g., a hardener) is contained within microcapsules 42 that are suspended in another part 44 (e.g., a resin) of the epoxy. When pressure is applied to the adhesive 32, the microcapsules 42 rupture such that the two parts 40, 44 intermix and begin to cure.

Initially, when the microencapsulated adhesive is applied to the inner surface 38 of the inner layer 28 of the hose 12, the microcapsules 42 in the adhesive 32 are substantially unruptured and the adhesive 32 maintains suitable fluidity to fill the imperfections 34. Sliding the hose 12 over the fitting 14 applies pressure to the adhesive 32 to rupture the microcapsules 42 and begin the curing process. The adhesive 32 has suitable fluidity to fill imperfections 34 on the fitting 14 and the hose 12. Once curing begins, the adhesive 32 increases in viscosity before finally solidifying at full cure. Thus, the microencapsulated adhesive 32 provides the benefit of maintaining a suitable viscosity initially to fill the imperfections 34.

As can be appreciated, other types of adhesives may also be used. In one example, a premixed adhesive 32, such as a premixed two-part epoxy or an acrylic adhesive (e.g., cyanoacrylate), is used. These adhesives 32 bond the fitting 14 and hose and fill the imperfections 34 to provide a leak-free connection, as described above. In another example, adhesives 32 having short cure times may begin to cure (and increase viscosity) before application to the hose 12 and fitting 14. Thus, the premixed adhesive 32 may not fill the imperfections 34 as well as a microencapsulated adhesive 32.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of creating a hose joint assembly, the method comprising the steps of:
   cutting a first hose disposed on a fitting and thereby scoring an imperfection in a surface of the fitting;
   removing the first hose from the fitting;
   applying an adhesive to at least one of an outer surface of the fitting or an inner surface of a second hose, wherein the adhesive is a microencapsulated adhesive that is a first fluid with microcapsules containing a second fluid dispersed in the first fluid;
   sliding the second hose onto the fitting;
   at least partially filling the imperfection with the adhesive;
   rupturing the microcapsules with pressure to mix the first fluid with the second fluid; and
   curing the adhesive once the first fluid and the second fluid are mixed to bond the fitting and the second hose together to seal a joint between the fitting and the second hose and to prevent a fluid flowing through the joint from leaking from the joint.

2. The method as recited in claim 1 wherein the step of sliding the second hose ruptures the microcapsules.

3. The method as recited in claim 1 wherein the first fluid comprises a first epoxy precursor and the second fluid in the microcapsules is a second epoxy precursor, and the microcapsules containing the second fluid are suspended in the first epoxy precursor.

4. The method as recited in claim 1 wherein the second hose comprises an inner layer and an outer layer.

5. The method as recited in claim 4 wherein the inner layer comprises an elastomer and the outer layer comprises a polymer.

6. The method as recited in claim 4 wherein the inner layer comprises ethylene propylene diene monomer and the outer layer comprises plastic.

7. The method as recited in claim 1 wherein the fitting is fluidly connected to at least one of a vehicle transmission or a radiator.

8. The method as recited in claim 1 wherein the fitting is metal and the second hose is rubber.

9. A method of creating a hose joint assembly, the method comprising the steps of:
   cutting a first hose disposed on a fitting and thereby scoring an imperfection in a surface of the fitting;
   removing the first hose from the fitting;
   applying an adhesive to at least one of an outer surface of the fitting or an inner surface of a second hose comprising an inner layer and an outer layer, wherein the adhesive is a microencapsulated adhesive that is a first fluid with microcapsules containing a second fluid dispersed in the first fluid, and the fitting is fluidly connected to at least one of a vehicle transmission or a radiator;
   sliding the second hose onto the fitting, wherein the step of sliding the hose ruptures the microcapsules;
   at least partially filling the imperfection with the adhesive;
   rupturing the microcapsules with pressure to mix the first fluid with the second fluid; and curing the adhesive to bond the fitting and the second hose together to seal a joint between the fitting and the second hose and to prevent a fluid flowing through the joint from leaking from the joint.

10. The method as recited in claim 9 wherein the first fluid comprises a first epoxy precursor and the second fluid in the microcapsules is a second epoxy precursor, and the microcapsules containing the second fluid are suspended in the first epoxy precursor.

11. The method as recited in claim 9 wherein the inner layer comprises an elastomer and the outer layer comprises a polymer.

12. The method as recited in claim 11 wherein the inner layer comprises ethylene propylene diene monomer and the outer layer comprises plastic.

* * * * *